INVENTOR.
JOHN L. EVANS

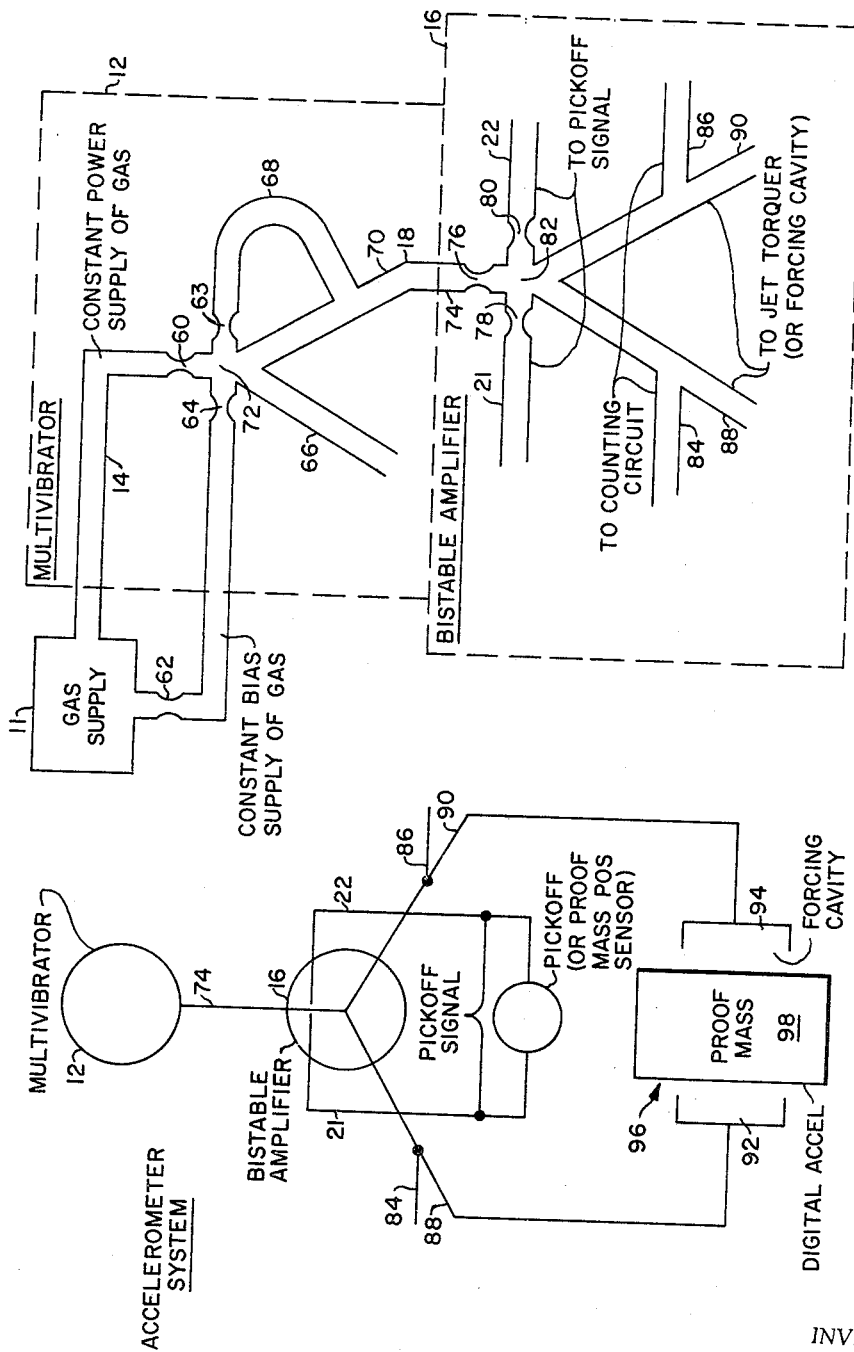

Jan. 20, 1970     J. L. EVANS     3,490,293
DIGITAL PNEUMATIC INSTRUMENT FORCING OR TORQUING SYSTEM
Filed Jan. 27, 1967     3 Sheets-Sheet 3

INVENTOR.
JOHN L. EVANS
BY
Constantine A. Michalos
ATTORNEY

United States Patent Office 3,490,293
Patented Jan. 20, 1970

3,490,293
DIGITAL PNEUMATIC INSTRUMENT FORCING OR TORQUING SYSTEM
John L. Evans, Oakland, N.J., assignor to Singer-General Precision, Inc., Little Falls, N.J., a corporation of Delaware
Filed Jan. 27, 1967, Ser. No. 612,263
Int. Cl. G01p 15/00
U.S. Cl. 73—515   7 Claims

ABSTRACT OF THE DISCLOSURE

A fluidic apparatus for obtaining a digital output from an analog fluidic device using a fluidic multivibrator for directing pulsating power to a fluidic bistable amplifier which in turn impinges pressurized fluid pulses of gas at a high frequency on the moving element of an instrument such as the rim of the rotor of a rate gyroscope or on the proof mass of a digital accelerometer.

CROSS-REFERENCES TO RELATED APPLICATION

U.S. patent application Ser. No. 489,913 by John L. Evans, Hugh E. Riordan, and Harold J. Straut assigned to same assignee as the present application.

BACKGROUND OF THE INVENTION

This invention relates generally to a fluidic apparatus for obtaining a digital output from an analog fluid device and, particularly, to a fluidic apparatus utilizing a fluidic multivibrator and a fluidic amplifier for providing a train of fluid pulses into a power jet or pressure chamber operably located at the rim of a rotor of a rate gyroscope for torquing said rotor towards null or operably producing pressure within forcing cavities at opposed locations of a proof mass within a digital accelerometer for forcing said proof mass towards null.

FIELD OF THE INVENTION

This invention makes it possible to obtain a digital output from an analog fluid device such as a rate gyroscope or an accelerometer. It takes an analog pickoff signal and uses it to pulse or force the device towards a null position. The differential pulse rate of the device provides a force differential which is proportional to the amount of torquing required on the rotor of the gyroscope or forcing required to move the proof mass to keep the instruments in a null position. That is, the force differential is proportional, in a properly operable unit, to the input physical quantity, such as acceleration for the accelerometer or angular rate for the gyroscope.

The pulse torquing or pulse forcing is done by impinging the pressurized pulses of gas at high frequency on the moving element such as the rotor of the rate gyroscope or the proof mass of the accelerometer, through a jet. It is also operable by placing a gas bearing near the moving element and using the pulses to pressurize the gas bearing forcing elements.

Therefore this invention is a device which converts an analog pneumatic pickoff signal to a digital torque or force on the moving element of a null seeking instrument.

DESCRIPTION OF THE PRIOR ART

It should be noted that heretofore no digital fluidic control system was available to provide a gas torquing for a gyroscope or a gas forcing for an accelerometer.

SUMMARY OF THE INVENTION

In the fluidic controlled instruments to which this invention is directed, a supply of pressurized gas is provided and is directed through a fluidic multivibrator which directs fluid pulses through a fluidic bistable amplifier which in turn is connected to jet torquers of a rate gyroscope or to each side of a proof mass in a digital accelerometer. The rate gyroscope can be of a type similar to that described and claimed in a copending U.S. patent application Ser. No. 489,913 by John L. Evans, Hugh E. Riordan, and Harold J. Straut which copending application is assigned to the same assignee as the present invention.

Therefore, an object of this invention is to provide a digital fluid output from a fluidic analog device.

Another object of this invention is to provide a null seeking closed-loop torquing apparatus utilizing differential fluid pressure as a control source for directing torquing pulses to the rotor of a rate gyroscope.

Another object of this invention is to provide a null seeking closed-loop forcing apparatus utilizing differential fluid pressure as a control source for directing pulses to each side of a proof mass of an accelerometer.

Another object of this invention is to provide for a fluidic device that converts an analog pneumatic pickoff signal to a digital torque or force on the moving elements of a null seeking instrument.

Still a further object of this invention is to provide a bistable fluidic element to switch a train of pressure pulses on the control of a pneumatic pickoff resulting in a digital forced rate.

An additional object of this invention is to provide an apparatus producing digital fluid force rate from an analog parameter to the moving element of an instrument for yielding a closed-loop digital null seeking instrument.

Other objects and many additional advantages will be more readily understood by those skilled in the art after a detailed consideration of the following specification taken with the accompanying drawings.

BRIEF DESCRIPTION OF THE DRAWINGS

FIGURE 2 is a schematic view showing a fragmentary detailed portion of the invention shown in FIGURE 1;

FIGURE 3 is a schematic diagram showing a detailed system of the invention in accordance with a specific embodiment;

DESCRIPTION OF THE PREFERRED EMBODIMENTS

Figure 1:
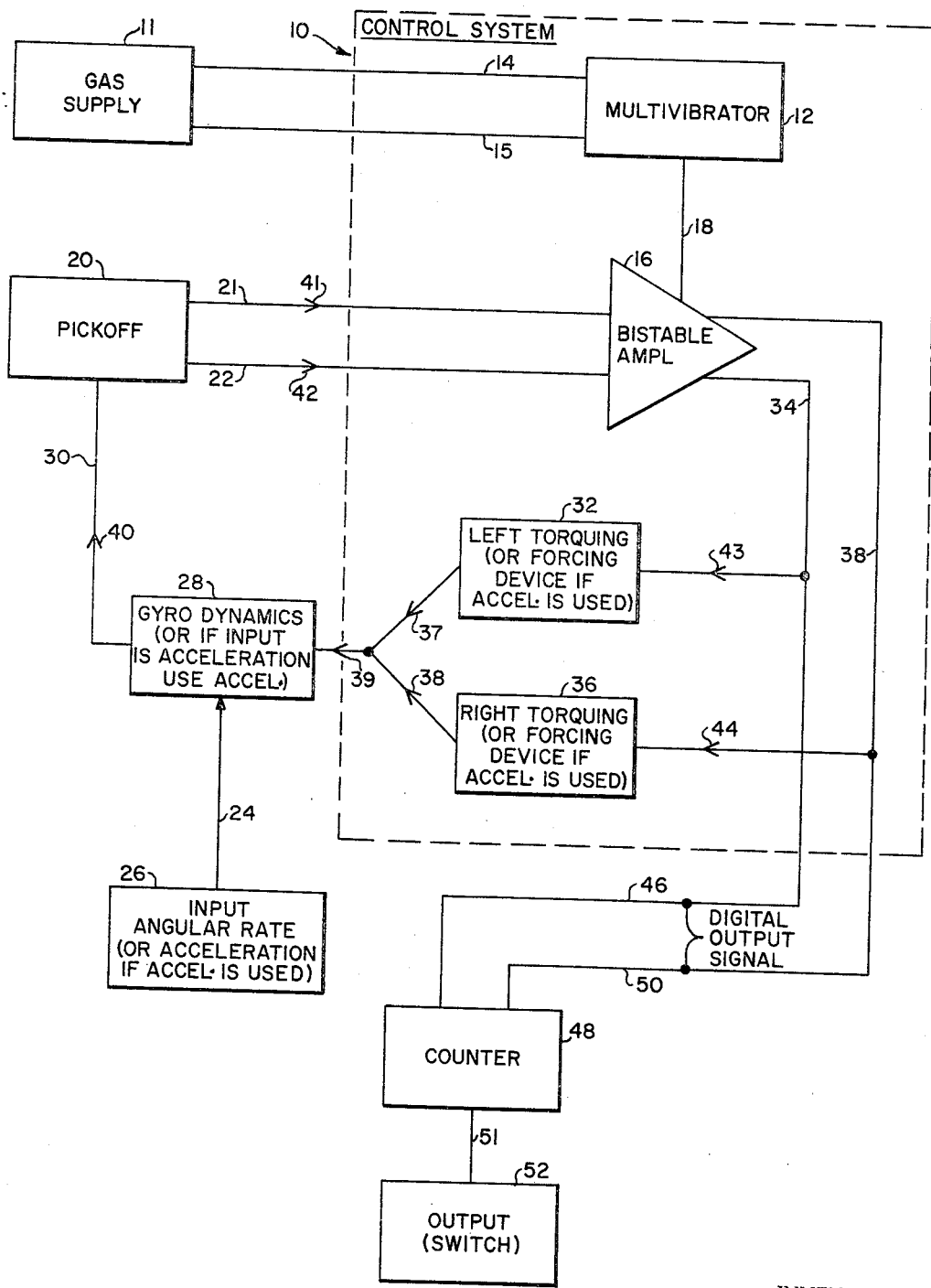
FIGURE 1 is a block diagram showing a digital pneumatic torquing or forcing system in which there is provided a schematic relation of one form of the system embodying the subject matter of the invention.

Referring to the drawing of FIGURE 1, there is shown a gas control system 10 receiving fluid power supply from a gas supply 11. From the gas supply 11, the fluid is directed to a multivibrator 12 of the control system 10 by a constant power supply fluidic line 14 and a constant biasing supply fluidic line 15 as hereinafter more fully described. The multivibrator 12 in turn directs pulsating fluid to a bistable amplifier 16 through pneumatic line 18.

The amplifier 16 receives signals from a pickoff device 20 through pneumatic lines 21 and 22. The pickoff, in turn, is activated by relative motion of the moving element of the instrument. This motion is the result of the input of a physical quantity such as acceleration for an accelerometer, or angular rate for a rate gyro to the instrument. The flow of this input quantity 26 is shown symbolically along line 24 to the instrument dynamics 28, gyrodynamics for the gyro or acceleration for an accelerometer. The result of the interaction of the instrument dynamics 28 and the input 26 then flows along line 30 to the pickoff 20. The pickoff 20 may be from a gyroscope as shown in detail in FIGURE 6 or if the input signals 26 are acceleration, the pickoff 20 may be from an accelerometer as shown in FIGURE 3.

The bistable amplifier 16 is pneumatically connected to a left torquing device 32 of a rate gyroscope which may also be a forcing device if an accelerometer is used, through a pneumatic line 34 and to a right torquing device 36 of a rate gyroscope which may also be a forcing device if an accelerometer is used, through a pneumatic line 38. A closed-loop is produced when the left torquing device 32 and the right torquing device 36 are applied to the moving element of the instrument. The closed loop of the block diagram of FIGURE 1 is shown directed by arrows 37 and 38 from the left and right torquing device 32 and 36 respectively to the gyrodynamic block 28 by arrow 39, to the pickoff 20 by arrow 40, to the bistable amplifier 16, as shown by arrows 41 and 42 and back to the left and right torquing devices 32 anad 36 as shown by arrows 43 and 44, respectively.

Further, as shown in FIGURE 1, a signal from the bistable amplifier 16 is directed from line 34 through line 46 to a counter 48 and from line 38 through a second line 50 to the counter 48. The counter 48 can then operate to direct an output through line 51 to actuate a switch 52 or the output may be used for any other allied purpose.

Figure 4:
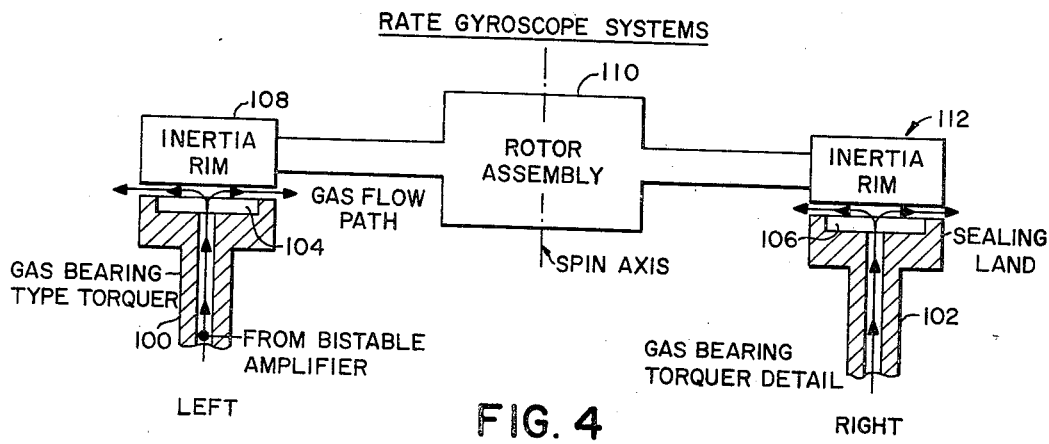
FIGURE 4 is a schematic side view of a detailed portion of the invention in accordance with another embodiment of the invention.

The multivibrator 12, shown in detail in FIGURE 2, is fluidically connected to the bistable amplifier 16. The multivibrator 12 is of the type having the gas supply 11 directing constant power or fluidic pressure to a power nozzle 60 through the line 14 at the same time directing biasing fluidic pressure through a restricted portion 62 in the line 15 to a control port or nozzle 64. The multivibrator 12 is designed with one output channel 66 discharging to the atmosphere and a feedback loop 68 capturing a feedback fluidic pressure stream as the power stream passes down another output channel 70 directing control input fluidic pressure to a control port of nozzle 63. This flow through loop 68 returns to interaction region 72 as a control stream which causes the power stream from nozzle 60 to switch to the opposite side or channel 66 where this sequence is repeated. The pulsating signal through output channel 70 is then directed to a power supply line 74 of the bistable amplifier 16 having a power nozzle 76. A pair of opposed control ports or nozzles 78 and 80 direct signals from the pickoff 20 through lines 21 and 22 to the interaction region 82 positioned downstream of the nozzle 76. Counting channels 84 and 86 located downstream of output channels 88 and 86 respectively of the amplifier 16 are connected to a counting circuit such as counter 48 through lines 46 and 50 shown in FIGURE 1. The fluidic pressure through channels 88 and 90 is then directed to forcing cavities 92 and 94 of a digital accelerometer 96 shown in FIGURE 3, having a proof mass 98 interposed therebetween or the fluidic pressure can be directed to jet or gas bearing torques shown in FIGURES 4 and 5. That is, in place of the cavities 92 and 94, the channels 88 and 90 of the bistable amplifier 16 can be connected to a pair of gas bearing type torquers 100 and 102 of a rate gyroscope 112 shown in FIGURE 4, where fluid pressure may be presented to pressure chambers 104 and 106, respectively. The pressure chambers 104 and 106 may be located adjacent to interia rim 108 of the rotor 110 of the rate gyroscope 112.

Figure 5:
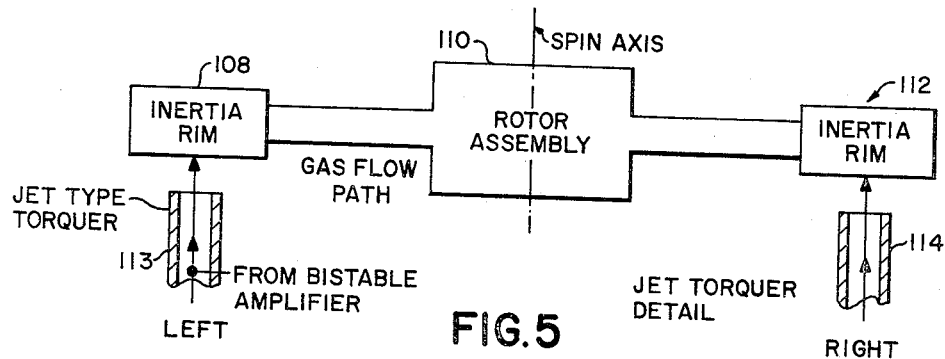
FIGURE 5 is a schematic side view showing still another detailed portion of the invention in accordance with another embodiment of the invention similar to that shown in FIGURE 4.

As shown in FIGURE 5, in place of the chambers 104 and 106 of the gas bearing type torquer, there is provided a pair of jet types torquers 113 and 114 which direct jet pressure to the inertia rim 108 of the rotor 110 of the rate gyro 112.

Figure 6:
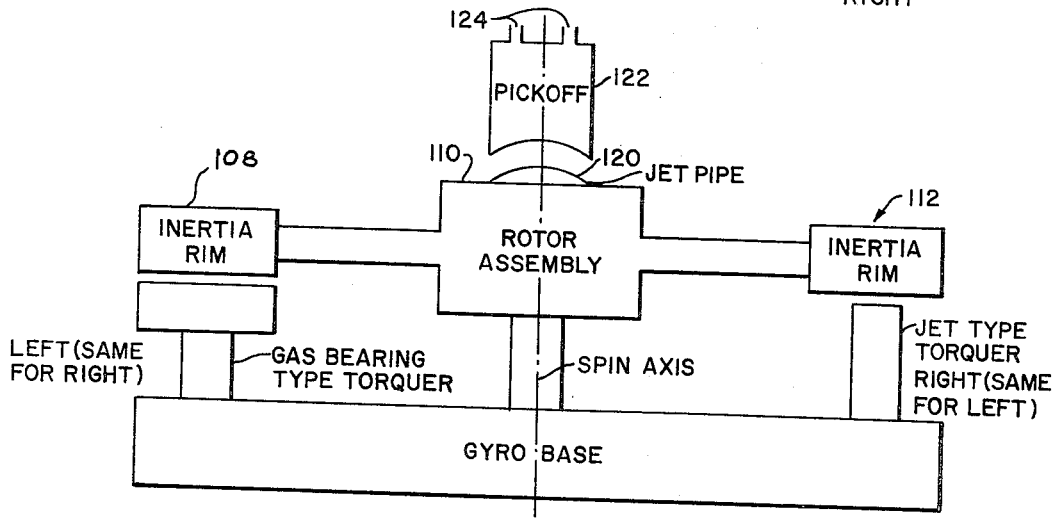
FIGURE 6 is a schematic side view showing still a further detailed portion of the invention in accordance with another embodiment of the invention similar to that shown in FIGURES 4 and 5.

Further, as is shown in FIGURE 6, the gyro rotor 110 may have a jet pipe 120 directing pressure to ta pickoff 122 which has respective fluid flow tubes 124 which connect to the amplifier 16 through lines 21 and 22 shown in FIGURE 2.

In the operation of the system, in which the gyroscopes are used, an input of a physical quantity such as an angular rate is put into the instrument. The instrument may deflect from null and the pickoff sends an appropriate pressure error signal. This is amplified and fed into the control ports or nozzles 78 and 80 of the bistable fluid amplifier 16. Meanwhile a train of fluidic pressure pulses from the fluid multivibrator 12 is fed into the power nozzle 76 of the amplifier 16. The control signal from the pickoff 20 switches the train pulses down one or the other output channels 88 and 90 of the bistable amplifier 16 to the appropriate torquers. The train of pulses impinge on the rotor rim 108 of the rotor 110 of the gyroscope 106 through the torquers causing it to re-erect, driving the pickoff output to zero. The pulse rates through the two output channels 88 and 90 are picked off downstream of the interaction region 82 through lines 84 and 86 to be counted by a counter such as 48 of FIGURE 1. The difference is proportional to the rate input.

It should be noted that replacing the gyrodynamics with the accelerometer dynamics and replacing the angular rate with acceleration changes the block diagram of FIGURE 1 to that of the accelerometer.

In summary therefore, it is shown that this invention is a device that converts an analog pneumatic pickoff signal to a digital torque or force on the moving elements of a null seeking instrument such as a rate gyroscope or accelerometer. The advantage of this type of control system is that it makes it possible to obtain digital output from heretofore analog devices. It also changes the device from a null seeking open-looped to a closed-loop digital null seeking instrument. This usually improves the performance of the system.

As brought out before, the general block diagram of the system, shown in FIGURE 1, is similar to both for an accelerometer use as well as a rate gyroscope use, but in both cases, it is essential that the bistable amplifier 16 be switched by the pickoff.

In addition, it should be noted that a pneumatic amplifier or Schmitt trigger may be interposed between the pickoff 20 and the bistable amplifier 16 to increase the pickoff gain, but it is not fundamentally important.

While the present invention has been described in a preferred embodiment, it will be obvious to those skilled in the art that various modifications can be made therein within the scope of the invention, and it is intended that the appended claims cover all such modifications.

What is claimed is:

1. A fluidic system for deriving digital output signals representative of a condition comprising:
   means for providing a source of fluidic pulses;
   a fluidic control device having a power input channel, a pair of opposed control channels, and a pair of power output channels;
   means connecting the source of fluidic pulses to the power input channel of said control device, said control device being adapted to switch said fluidic pulse source between one or the other of said output channels depending upon the presence of an input signal on one or the other of said opposed control channels;
   a member displaceable from a null position in response to a condition;
   pickoff means having two outputs one of which is responsive to displacement of said member away from its null position in one direction and the other of which is responsive to displacement of said member away from its null position in the opposite direction; means for connecting said pickoff means outputs to respective ones of said opposed control channels; a pair of fluid motors for moving said displaceable member in opposite directions respectively whereby said displaceable member may be returned to its null position; means connecting the output channels of said fluid control device to each of said fluid motors respectively; and output means responsive to the conditions in each of said output channels.

2. The system of claim 1 wherein the outputs of said pickoff means are analog signals proportional to the magnitude of displacement of said member in each of said directions respectively whereby said analog signals control the number of pulses received by each respective fluid motor for repositioning said displaceable member at its null position.

3. The system of claim 1 wherein said output means comprises a pair of counting channels each extending from a different one of the output channels of said control device and a counter communicating with said counting channels for producing a digital output signal dependent on the pulsed output signal received from said control device.

4. The system of claim 1, wherein said movable member is the proof mass of an accelerometer and said pickoff means is a proof mass position sensor, said pair of fluid motors including a pair of opposed spaced forcing cavities having said proof mass interposed therebetween, each forcing cavity connecting a respective output channel of said control device for receiving digital output signals or different number of pulses per unit time proportional to the input signal or acceleration sensed by said pickoff means whereby the pulses are applied to said proof mass for directing said proof mass to its null position within said accelerometer.

5. The system of claim 1, wherein said movable member is the rotor of a rate gyroscope, said rotor having an inertia rim, and said fluid motors are operable for directing digital fluid pulses against said inertia rim until said rotor reaches its null position in said gyroscope.

6. The system of claim 5, wherein said fluid motors comprise a pair of opposed gas bearing torquers having pressure chambers located adjacent the inertia rim for receiving and applying the digital fluid pulses to the inertia rim until said rotor reaches its null position.

7. The system of claim 5, wherein said fluid motors comprise a pair of opposed jet type torquers located adjacent the inertia rim for receiving and applying the digital fluid pulses to the inertia rim until said rotor reaches its null position.

References Cited

UNITED STATES PATENTS

| 2,943,493 | 7/1960 | Ten Bosch et al. | 73—503 |
| 3,117,456 | 1/1964 | Wing | 73—503 |

FOREIGN PATENTS

| 669,829 | 1/1939 | Germany. |

OTHER REFERENCES

Machine Design of June 24, 1965, pp. 158 and 172. Article entitled "Design Guide—Pure Fluid Devices," by L. Wood.

JAMES J. GILL, Primary Examiner

U.S. Cl. X.R.

73—503; 74—5; 137—81.5